United States Patent
Kaltenbach et al.

(10) Patent No.: US 9,599,194 B2
(45) Date of Patent: Mar. 21, 2017

(54) VEHICLE TRANSMISSION IN GROUP CONSTRUCTION

(71) Applicant: ZF Friedrichshafen AG, Friedrichshafen (DE)

(72) Inventors: Johannes Kaltenbach, Friedrichshafen (DE); Eckhardt Lubke, Friedrichshafen (DE); Kai Borntrager, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 142 days.

(21) Appl. No.: 14/629,684

(22) Filed: Feb. 24, 2015

(65) Prior Publication Data

US 2015/0267779 A1    Sep. 24, 2015

(30) Foreign Application Priority Data

Mar. 19, 2014    (DE) .................. 10 2014 205 072

(51) Int. Cl.
   *F16H 37/08*   (2006.01)
   *F16H 3/62*    (2006.01)
   *F16H 3/44*    (2006.01)

(52) U.S. Cl.
   CPC ............ *F16H 3/62* (2013.01); *F16H 3/44* (2013.01); *F16H 37/0833* (2013.01); *F16H 2200/006* (2013.01); *F16H 2200/0069* (2013.01); *F16H 2200/0086* (2013.01); *F16H 2200/0091* (2013.01)

(58) Field of Classification Search
   None
   See application file for complete search history.

(56) References Cited

U.S. PATENT DOCUMENTS

| 8,408,084 | B2 | 4/2013 | Gitt et al. | |
|---|---|---|---|---|
| 2008/0280726 | A1* | 11/2008 | Holmes | B60K 6/387 477/5 |
| 2011/0072923 | A1* | 3/2011 | Dittrich | F16H 37/042 74/333 |
| 2014/0038769 | A1* | 2/2014 | Kaltenbach | F16H 37/042 475/302 |

(Continued)

FOREIGN PATENT DOCUMENTS

DE    10 2007 047 671 A1    4/2009

*Primary Examiner* — Justin Holmes
(74) *Attorney, Agent, or Firm* — Davis & Bujold, PLLC; Michael J. Bujold

(57) ABSTRACT

A motor vehicle transmission having main group and a range group that is connected downstream from the main group which has a planetary stage with transmission components. A first component couples an output shaft of the range group and a second component couples an output shaft of the main group. A third component can couple a housing and the first or the second components. For carrying out a range shift of the range group, which cannot be shifted under load, and to enable an arrangement of gear steps of the upstream main group, the drive output shaft passes axially through the planetary stage to the main group. The output shaft is a central shaft with which the input shaft of the main group can be connected in a rotationally fixed manner, and over which the output shaft of the main group is positioned as a coaxially extending hollow shaft.

10 Claims, 6 Drawing Sheets

(56) References Cited

U.S. PATENT DOCUMENTS

2014/0171263 A1* 6/2014 Steinborn ............ F16H 61/702
  477/79
2015/0068336 A1* 3/2015 Peterson ................ F16H 3/006
  74/330

* cited by examiner

| GEAR | | S5/S6 | S3/S4 | S1/S2 | S7/S8 | |
|---|---|---|---|---|---|---|
| 1 | K1 | S6 | | | S7 | UD1 |
| 2 | K2 | | S3 | S2 | S7 | UD2 |
| 3 | K1 | | | S1 | S7 | UD3 |
| 4 | K2 | S5 | | | S7 | UD4 |
| 5 | K1 | | | | | DIRECT |
| 6 | K2 | | S3 | S2 | S8 | OD1 |
| 7 | K1 | | | S1 | S8 | OD2 |
| 8 | K2 | | | | S8 | OD3 |
| R1 | K1 | | S4 | | S7 | |
| R2 | K1 | | S4 | | S8 | |

Fig. 2

| GEAR | | S1/S2 | S3/S4 | S5/S6 | S7/S8 | |
|---|---|---|---|---|---|---|
| 1 | K1 | S2 | | | S8 | UD1 |
| 2 | K2 | | | S6 | S8 | UD2 |
| 3 | K1 | | S4 | | S8 | UD3 |
| 4 | K2 | | | S5 | S8 | UD4 |
| 5 | K1 | S1 | | | | DIRECT |
| 6 | K2 | | | S6 | S7 | OD1 |
| 7 | K1 | | S4 | | S7 | OD2 |
| 8 | K2 | | | S5 | S7 | OD3 |
| R1 | K1 | | S3 | | S8 | |
| R2 | K1 | | S3 | | S7 | |

| GEAR | | S1/S2 | S3 | S4/S5 | S6/S7 | S8/S9 |
|------|----|-------|----|-------|-------|-------|
| 1    | K2 | S2    | S3 |       |       | S9    |
| 2    | K1 |       | S3 | S5    |       | S9    |
| 3    | K2 | S2    |    | S5    | S6    | S9    |
| 4    | K1 |       | S3 |       | S6    | S9    |
| 5    | K2 | S1    | S3 |       | S6    | S9    |
| 6    | K2 | S2    |    | S4    |       |       |
| 7    | K1 |       | S3 | S4    |       |       |
| 8    | K2 | S2    |    |       | S6    | S8    |
| 9    | K1 | S1    | S3 |       | S6    | S8    |
| 10   | K2 | S2    |    |       | S6    | S8    |
| R1   | K2 | S2    |    |       | S7    | S9    |
| R2   | K1 |       | S3 |       | S7    | S9    |
| R3   | K2 | S1    |    |       | S7    | S9    |

VEHICLE TRANSMISSION IN GROUP CONSTRUCTION

This application claims priority from German patent application serial no. 10 2014 205 072.3 filed Mar. 19, 2014.

FIELD OF THE INVENTION

The invention concerns a motor vehicle transmission with a group configuration, comprising an at least partially powershiftable main group and a range group connected downstream from the main group, which comprises a planetary stage having transmission components in the form of a ring gear, a sun gear, and a planetary carrier that guides at least one planetary gearwheel, wherein of these transmission components a first transmission component is connected to a drive output shaft of the range group and a second transmission component is connected to an output shaft of the main group, while in contrast a third transmission component can, on the one hand, be fixed to a housing and, on the other hand, can be coupled to the first or the second transmission component, and wherein the drive output shaft of the range group can be connected by means of a shifting element directly and in a rotationally fixed manner to an input shaft of the main group.

BACKGROUND OF THE INVENTION

Motor vehicle transmissions designed with a group configuration are used in particular in the sector of commercial vehicles and enable the engagement of a large number of shiftable gears. Often, a motor vehicle transmission of this type consists of a main group, a splitter group connected upstream therefrom and a range group usually connected downstream therefrom, while depending on the application further transmission groups can also be provided, such as a reversing group and a crawling group.

By means of a main group, gear steps of the transmission are defined, which are influenced correspondingly by the other transmission groups connected upstream and downstream therefrom. Thus, an upstream splitter group compresses a gear sequence of the main group in that the gear steps of the main group are separated by small step intervals of the splitter group. In contrast, the downstream range group extends the gear sequence of the main group by virtue of transmission ratio intervals that are chosen large, whereby the gear steps of the main group are distributed between different gear ratio ranges.

Whereas in such cases a splitter group and even a main group of a motor vehicle transmission designed with a group configuration are often designed to be powershiftable, a range group connected downstream is in most cases still designed as a shiftable, variable-speed transmission unit in which a change between the different range ratios is only possible with interruption of the traction force. However, in some motor vehicle transmissions of group configuration changes under load between range ratios are enabled by the provision of special connection options of the range group to the group transmission upstream from it.

DE 10 2007 047 671 A1 describes a motor vehicle transmission with a group configuration which consists of a main group in the form of a dual-clutch transmission and a range group connected downstream from the main group. In this case the dual-clutch transmission comprises two partial transmissions with input shafts that extend coaxially with one another, each of which can be connected by way of an associated powershift element to a drive input side of the motor vehicle transmission and by means of a respective transmission ratio step, can be brought into connection with a countershaft of an axially offset countershaft gear arrangement. Furthermore, the input shaft in the form of a central shaft can be coupled in a rotationally fixed manner to a coaxially extending output shaft of the dual-clutch transmission. Between the countershaft and the output shaft four transmission steps are also provided, by means of which in each case rotational movement of the countershaft can be converted into a corresponding rotational speed of the output shaft. Three of the four transmission steps define forward gears of the main group, while one transmission step is made with an intermediate wheel and accordingly, when connected into a force flow, brings about a reversal of the rotation direction of the output shaft compared with the other transmission steps. The range group connected downstream from the main group consists of a planetary stage formed by a planetary carrier, a centrally positioned sun gear and a radially outer ring gear, such that planetary gearwheels guided by the planetary carrier mesh both with the radially inner sun gear and with the ring gear. The sun gear is positioned on the output shaft of the main group, whereas the planetary carrier is connected to a drive output shaft of the range group and thus also of the motor vehicle transmission. To obtain two different range ratios of the range group the radially outer ring gear can on the one hand be fixed to a surrounding housing of the motor vehicle transmission and on the other hand coupled rotationally fixed to the drive output shaft and the planetary carrier.

To be able now to carry out a change of the range ratio even under load, on an axial side facing away from the drive output shaft the planetary carrier of the range group can be connected to a gearwheel of the adjacent gear step of the main group mounted to rotate on the output shaft so that, bypassing the range group, rotational movement of the gearwheel is converted directly into rotational movement of the drive output shaft with a rotational speed corresponding to that of the gearwheel. In this case the change of the range ratio is then brought about in that a highest gear of the main group with the lower range ratio of the range group and a lowest gear of the main group with the higher range ratio of the range group are engaged at the same time by way of one partial transmission of the dual-clutch transmission and correspond to one another in their effective transmission ratios. The lowest gear of the main group with the higher ratio of the range group is obtained by coupling the gearwheel mounted to rotate on the output shaft of the main group to the planetary carrier of the range group, so that the range group operates while free from load and consequently a shift can be carried out within the range group without problems by fixing the ring gear to the housing.

SUMMARY OF THE INVENTION

Starting from the prior art described above, the purpose of the present invention is now to provide a motor vehicle transmission of group configuration in which a change of a range ratio of a range group that cannot in itself be shifted under load, can be carried out without traction force interruption, but at the same time a gear ratio arrangement largely independent of this is made possible in a main group connected upstream thereof.

That objective is achieved by a motor vehicle transmission of group configuration having the characteristics described below.

According to the invention, a motor vehicle transmission with a group configuration comprises an at least partially powershiftable main group and a range group connected downstream from the main group, which range group comprises a planetary stage with transmission components in the form of a ring gear, a sun gear and a planetary carrier that guides at least one planetary gearwheel. In this case, of these transmission components a first transmission component is connected to a drive output shaft of the range group and a second transmission component to an output shaft of the main group, whereas in contrast a third transmission component can, on the one hand, be fixed to a housing and, on the other hand, coupled to the first or the second transmission component. To bypass the downstream range group, the drive output shaft of the range group can also be coupled directly in a rotationally fixed manner to an input shaft of the main group. In the context of the invention an at least partially powershiftable main group' is understood to mean that at least one change between the various gears of the main group can be carried out under load, i.e. without interruption of the traction force. In the present context this can mean either that shifts under load can be carried out between all the forward gears of the main group, or that a change without traction force interruption is only possible between particular forward gears. Furthermore, in a change from forward gears to at least one reverse gear of the main group as well, the traction force can be interrupted, although in that case as well powershifts can sometimes be carried out by virtue of appropriate measures in the area of the main group, for example to enable more effective maneuvering.

The planetary stage of the downstream range group is in particular in the form of a minus planetary gearset, in which one or more of the planetary gearwheels guided by the planetary carrier mesh respectively with both the radially inner sun gear and also with the radially surrounding ring gear. As usual with a planetary stage, the transmission components sun gear, ring gear and planetary carrier and the elements output shaft, drive output shaft and gearwheel of the transmission stage connected therewith are arranged coaxially with one another.

The invention now embodies the technical feature that the drive output shaft passes axially through the planetary stage and to the transmission stage of the main group, since the drive output shaft is designed as a central shaft to which the input shaft of the main transmission can be connected in a rotationally fixed manner and on which the output shaft of the main group is positioned as a coaxially extending hollow shaft. In other words the drive output shaft of the range group, which is at the same time the drive output shaft of the motor vehicle transmission as a whole, extends axially in the direction toward the main group since, being in the form of a central shaft, it passes through the planetary stage. The input shaft of the main transmission can be coupled rotationally fixed to the drive output shaft extended to meet it. In this case the coupling advantageously takes place by means of a single shifting element. The output shaft of the main group is also in the form of a hollow shaft and extends over the drive output shaft.

Such a design of a motor vehicle transmission has the advantage that the force flow of the bypass gear, by means of which the range group can be bypassed, passes through the range group from the drive input shaft directly by way of a shifting element, preferably via a single shifting element, to the drive output shaft. This is because since the drive output shaft passes through the range group, the drive output shaft can also extend axially farther into areas of the main group, i.e. to wheel planes axially farther inside, and can there be coupled to the input shaft, and this preferably directly by a single shifting element and without the need for intermediate gearwheels. The force flow via the direct gear does not pass through spur gear stages, but connects the internal combustion engine directly to the drive output shaft. Correspondingly, however, the gear step of the main group axially adjacent to the range group does not have to be in the form of a gearset of a forward gear, but can also be in the form of a gearset of a reversing gear, whereby the assembly complexity of the motor vehicle transmission according to the invention is reduced and the arrangement of the gear steps of the main transmission can be better adapted to any shaft flexures that take place. This is because between the main group and the range group a separation plane of a housing that accommodates the main group and the range group is usually located, so that when a gearset of a reversing gear is arranged in this area bearing points for one or more intermediate wheel bolts are accessible without difficulty and accordingly one or more intermediate wheels can be fitted without problems of assembly technique. Furthermore, since gearwheels on the drive input side of a reversing-gear gearset usually have the smallest diameter compared with gearwheels of the other gearsets, their arrangement in the area of a shaft end on the drive input side, i.e. depending on the design of the main group in the area of a shaft end of an input shaft or of a countershaft, is again advantageous from the standpoint of any shaft flexures that occur. Thus, overall assembly complexity is reduced and better adaptation of an arrangement of main group gear steps to any shaft flexures that take place is made possible.

In the context of the invention a central shaft is understood to mean a shaft extending centrally on a respective rotational axis, which can be in the form of a solid shaft, a shaft perforated by bores, for example supply ducts, or even a hollow shaft. In contrast, the output shaft designed as a hollow shaft is provided radially surrounding this central shaft.

Otherwise than as above, in the motor vehicle transmission of DE 10 2007 047 671 A1 the gear step of the main group adjacent to the range group must always be in the form of a forward gear, since in the case of the coupling that can be formed in DE 10 2007 047 671 A1 between the planetary carrier and the gearwheel of the gear step on the drive output side, no connection to axially farther in gear steps is possible. Consequently, the gearset of the reversing gear cannot be located axially outside on the main group, so that to position an intermediate wheel together with an intermediate wheel bolt an additional separation plane of the housing in the area of the gearset has to be provided. This correspondingly increases the assembly technique complexity. Moreover, because of this no arrangement of the gear steps of the main group adapted for the flexure of the countershaft can be achieved.

Furthermore, in the motor vehicle transmission of DE 10 2007 047 671 A1 the force flow of the bypass gear always passes via the carrier of the range group, whereas in the transmission according to the invention, in the bypass gear the range group is completely free from load, i.e. it is not involved in the force flow. In an advantageous embodiment of the invention the drive output shaft of the range group can be connected directly and in a rotationally fixed manner to an input shaft of the main group by means of a single shifting element. This has the advantage that the number of shifting elements required for the engagement of the bypass gear, in this case in the form of a direct gear, can be minimized so that the shifting sequence can also be simplified.

In a further advantageous embodiment of the invention the drive output shaft of the range group can be also connected in a rotationally fixed manner to the output shaft by a shifting element.

As another alternative the motor vehicle transmission can also be made with two countershaft gear arrangements that extend axially offset relative to the output shaft and the at least one input shaft, by way of which, however, the force flow passes in alternation when the gears are engaged. Thus, for example, a design of the main group as a dual-clutch transmission can be considered, in which these two parallel countershaft gear arrangements are associated with different partial transmissions of the dual-clutch transmission.

On the other hand, the main transmission can be designed such that power is always transmitted by way of both countershafts, i.e. power splitting takes place.

In a further design of the invention, which in this case is supplementary to one of the above variants, two countershaft gear arrangements axially offset relative to the output shaft and the at least one input shaft are provided, such that, on the one hand, gear steps of the main group located between the at least one input shaft and the countershaft gear arrangements and, on the other hand, gear steps of the main group between the output shaft and the countershaft gear arrangements each comprise a gearwheel on the side of the at least one input shaft or of the output shaft, which gearwheel in each case is connected on both sides to gearwheels on the countershaft gear arrangements. In this case therefore, the main group of the motor vehicle transmission according to the invention is made with two countershaft gearsets, by virtue of which the force flow in the respective gears of the motor vehicle transmission passes simultaneously by way of the two parallel countershaft gear arrangements. As a result, the drive power is correspondingly divided between the two parallel countershaft gear arrangements and thereafter brought together again in the output shaft and, via the gearwheel that can be connected to the drive output shaft, in the drive output shaft. Owing to this power branching the gearwheels of the gear steps can be made narrower, which enables the overall axial length of the motor vehicle transmission to be reduced.

A further design of the invention is one in which the main group consists of two partial transmissions which have input shafts that extend coaxially one over the other and can in each case participate in a force flow to the drive output shaft in alternation by connecting the respectively associated input shaft with a drive input side. Consequently, in this case the main group of the motor vehicle transmission according to the invention is in the form of a dual-clutch transmission in which powershifting ability is realized by an alternating association of the obtainable gears with the two partial transmissions, so that in a consecutive shifting sequence of the gears shifts always take place back and forth between the two partial transmissions. In this case, on the drive input side the partial transmissions can each be connected by an associated powershifting element and the two powershifting elements of the respective partial transmissions are preferably combined in a dual clutch. However, apart from the configuration as a dual-clutch transmission, the main group can also be in the form of a stepped transmission in which the individual gear steps can be connected by means of powershiftable shifting elements such as disk clutches.

In a further development of the invention a main group gear immediately adjacent to the range group is designed as the gearset of a reversing gear. The provision of a gearset of the reversing gear on a drive output side of the main group has the advantages already mentioned earlier, that in this transition area between the main group and the range group at least one housing separation plane is provided, which enables the intermediate wheel together with its wheel bolt to be fitted without problems and without providing additional housing separation planes. In addition a drive input side gearwheel of the gear step of a reversing gear is usually made with the smallest diameter, so that such a positioning of the gear step is advantageous in relation to the flexure of the shaft carrying it.

In a further advantageous embodiment of the invention the first transmission component of the range group is the planetary carrier and the second component of the range group is its sun gear, whereas the ring gear forms the third transmission component of the range group. Alternatively, however, the transmission components of the range group can also be connected in accordance with other combination options.

In a further advantageous design the gears produced by the spur gear stages are all overdrive gears.

In another advantageous design a double shifting element is provided, by means of which the direct gear can optionally either be engaged directly with the drive output shaft, or alternatively it can be connected to the sun gear of the range group. The advantage of this is that by connecting it to the sun gear of the range group the direct gear of the main transmission can also be used in the slow range.

The invention is not limited to the specific combination of characteristics indicated in the principal claim or in the dependent claims. There are also possibilities for combining individual features with one another, provided that they emerge from the claims, from the description of an embodiment of the invention given below, or directly from the figures. The reference of the claims to the drawings by the use of indexes is not intended to restrict the protective scope of the claims.

BRIEF DESCRIPTION OF THE DRAWINGS

Below, further measures that improve the invention are indicated in more detail, along with the description of a preferred embodiment of the invention, which relates to the drawings represented in the figures, showing:

FIG. 2: A shifting matrix for the transmission in FIG. 1;

FIG. 4: A shifting matrix for the transmission in FIG. 3;

FIG. 6: A shifting matrix for the transmission in FIG. 5.

DETAILED DESCRIPTION OF THE PREFERRED EMBODIMENTS

Figure 1:
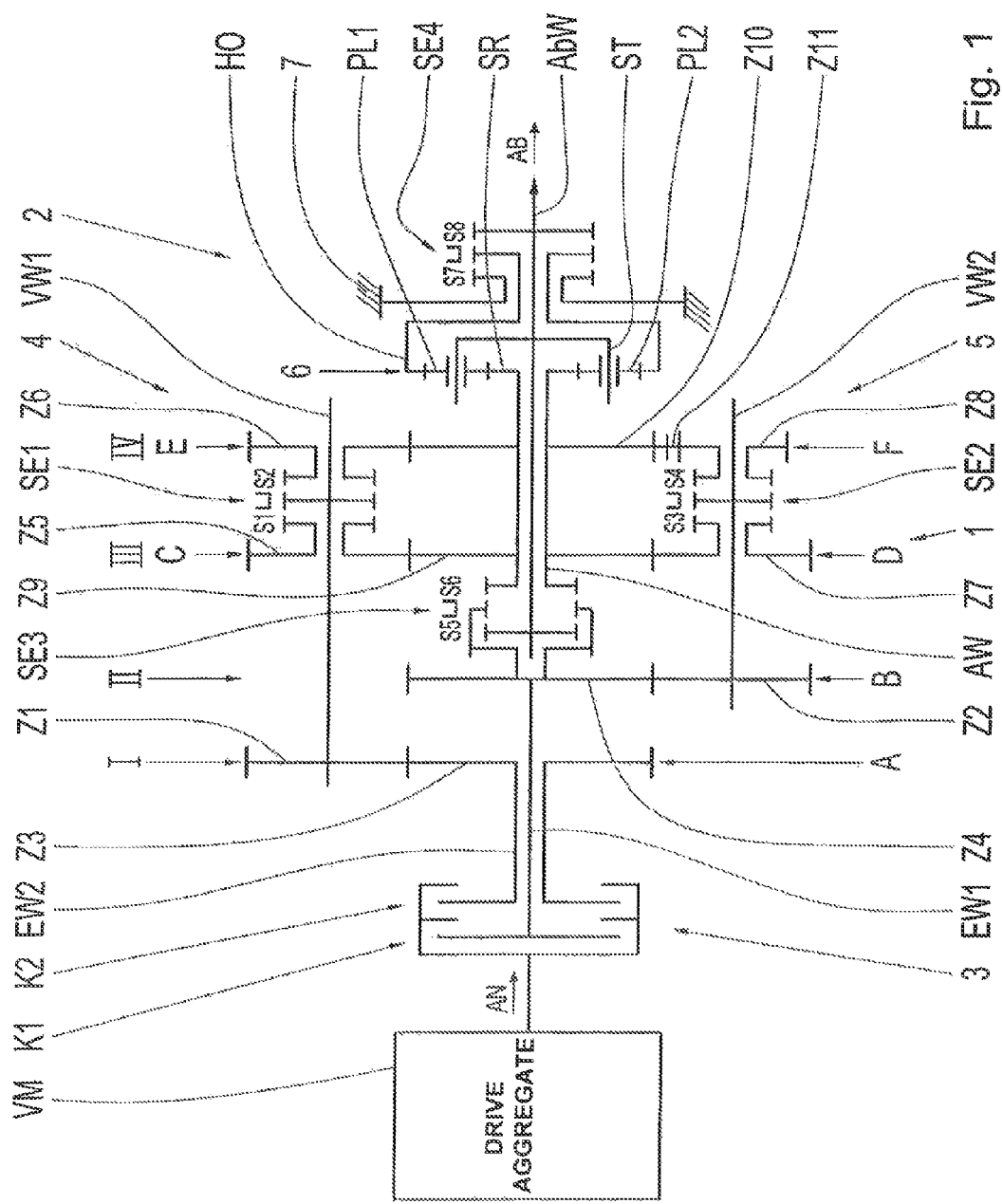
FIG. 1: A schematic representation of a motor vehicle transmission according to a first preferred embodiment of the invention.

FIG. 1 shows a schematic view of a motor vehicle transmission according to a first preferred embodiment of the invention, this motor vehicle transmission preferably being the transmission of a commercial vehicle. In this case the motor vehicle transmission comprises a main group 1 and a range group 2 connected downstream from the main group 1, the main group 1 and the range group 2 being provided between a drive input side AN and a drive output side AB of the motor vehicle transmission.

As can be seen from FIG. 1, in the present case the main group 1 is designed in the form of a dual-clutch transmission and consists of two partial transmissions, each being associated with a respective input shaft EW1 and EW2. The input shaft EW1 of the first partial transmission is a central transmission shaft with which the input shaft EW2 of the second partial transmission, in the form of a hollow transmission shaft, is coaxial. The two partial transmissions can now each be linked in alternation into a force flow from the drive input side AN of the motor vehicle transmission, which in the assembled condition of the transmission is connected with a drive aggregate VM of the motor vehicle, to the drive output side AB, in that either the input shaft EW1 of the first partial transmission can be coupled to the drive input side AN by means of an associated powershift element K1 or the input shaft EW2 of the second partial transmission can be coupled thereto by means of a second powershift element K2. In this case the two powershift elements K1 and K2 are combined in a dual clutch 3, this being a wet-operating dual clutch.

Furthermore, there extends coaxially with the two input shafts EW1 and EW2, an output shaft AW of the main group 1, which in this case is a hollow shaft. In addition, axially offset relative to the input shafts E1 and EW2 and also to the output shaft AW there are arranged two countershaft gear arrangements 4 and 5, each having a respective countershaft VW1 and VW2.

Rotational movement of the drive input side AN can now on the one hand be transmitted via one of the two partial transmissions, with the corresponding transmission ratio, to the output shaft AW since the force flow, starting from the input shaft EW1 or EW2 concerned, passes via one of several gear steps A, B to the countershaft gear arrangement 4 and 5 and, starting from there, passes via one of several further gear steps C to F and on to the output shaft AW. However, apart from passing the force flow via the intermediate gears 4 and 5, the input shaft EW1 can also be coupled directly to the output shaft AW so that a direct through-drive to the output shaft and thus a direct gear of the main group 1 is defined.

As can also be seen from FIG. 1, the gear steps A to F are arranged in a total of four wheel planes I to IV, such that each of the gear steps A to F has gearwheels Z1 and Z2 arranged rotationally fixed on the countershaft gear arrangements 4 and 5. In this case the gearwheel Z1 is located rotationally fixed on the countershaft VW1 of the first countershaft gear arrangement 4 and the gearwheel Z2 is rotationally fixed on the countershaft VW2 of the second countershaft gear arrangement 5. The gearwheels Z1 and Z2 are in each case in connection with a respective fixed wheel Z3 and Z4 arranged on the input shaft EW1 or the input shaft EW2, and form the input constants. The gearwheels Z5, Z6 and Z7 are loose wheels arranged on the countershafts VW1 and VW2, which mesh with fixed wheels Z9 and Z10 arranged on the output shaft AW of the main transmission.

In gear step F the gearwheel Z8 arranged on the countershaft VW2 is connected to the intermediately positioned gearwheel Z10 in that between the gearwheels Z8 and Z10 there is arranged an intermediate wheel Z11, which meshes on one side with the radially inner gearwheel Z10 and on the other side with the respective radially outer gearwheel Z8. Consequently, during the transmission of rotational movements of the countershaft VW2 to the output shaft AW by way of the gear step F, compared with the other gear steps a reversed rotation direction of the output shaft is produced, i.e. a reversing gear of the main group 1 is defined.

By means of the gear step A, rotational movement of the input shaft EW2 can now be transmitted to the countershaft gear arrangement 4 and by means of the gear step B, rotational movement of the input shaft EW1 can be transmitted to the countershaft gear arrangement 5. In the gear step C, the gearwheel Z5 of the gear step C can be connected rotationally fixed to the countershaft VW1 by means of a shifting element S1 and the gearwheel Z6 of the gear step E can be connected rotationally fixed to the countershaft VW1 by means of a shifting element S2. In the gear step D, the gearwheel Z7 of the gear step D can be connected rotationally fixed by means of a shifting element S3 to the countershaft VW2 and the gearwheel Z8 of the gear step F can be connected rotationally fixed by means of a shifting element S4 to the countershaft VW2.

As a special feature, the gearwheel Z4 of the gear step B can also be coupled by means of a shifting element S5 to the drive output shaft AbW and also coupled by means of a shifting element S6 to the output shaft AW.

In the present case the shifting elements S1 to S6 are each interlocking shifting elements in the form of claw clutches, and the shifting elements S1 and S2 are combined in a first shifting device SE1, the shifting elements S3 and S4 in a second shifting device SE2, and the shifting elements S5 and S6 in a third shifting device SE3. With each of the shifting devices SE1 to SE3 there is associated in each case one actuator (not shown here), by means of which a respective axially displaceable shifting claw of the shifting device SE1 or SE2 or SE3 concerned can be moved axially, thereby actuating the respectively associated shifting element S1 or S2 or S3 or S4, or S5 or S6.

The range group 2 connected downstream from the main group 1 has a planetary stage 6 formed by the transmission components sun gear SR, planetary carrier ST and ring gear HO. In this case the planetary stage 6 is designed as a minus planetary gearset, in which the planetary carrier ST carries a number of planetary gearwheels PL1 and PL2 mounted to rotate upon it, these gearwheels meshing both with the radially inner sun gear SR and with the radially surrounding ring gear HO. In the present case the sun gear SR is arranged in a rotationally fixed manner on the output shaft AW of the main group 1, whereas the planetary carrier ST is coupled rotationally fixed to the drive output shaft AbW of the range group 2 which, at one end of the shaft, also forms the drive output side AB of the motor vehicle transmission.

The ring gear HO of the planetary stage 6 can also on the one hand be connected rotationally fixed to the drive output shaft AbW by means of a shifting element S8, so that the ring gear HO rotates locked onto the planetary carrier ST, and on the other hand it can be fixed by a shifting element S7 to a surrounding housing 7. In the first case a locked rotation of the planetary carrier ST and the ring gear HO causes the sun gear connected to the output shaft AW also to rotate at the same rotational speed so that by way of the range group 2 a solid through-drive is obtained, this corresponding to a first, high gear of the range group 2. In contrast, if the ring gear is fixed to the surrounding housing 7 by the shifting element S7, then the planetary gearwheels PL1 and PL2 undergo rolling movements on the ring gear HO, which results in a slower rotational movement of the planetary carrier ST compared with the rotational speed of the sun gear SR. This corresponds to a second, lower gear of the range group 2. The shifting elements S7 and S8 are each designed as locking synchronizers and are combined in a fourth shifting device SE4, whose common sliding sleeve (not shown) can be displaced axially by an actuator (also not shown) either to a shift position that actuates the shifting element S7 or to one that actuates the shifting element S8.

As a special feature the drive output shaft AbW of the range group 2 passes, on a side facing away from the drive output side AB, axially through the planetary stage 6 and extends to a point in front of the wheel plane III of the main group 1 ahead of it, so as to enable direct coupling to the input shaft EW1 when the shifting element S5 is actuated. in this case the drive output shaft AbW is made as a central shaft over which extends the output shaft AW in the form of a hollow shaft. In this case a rotationally fixed coupling between the input shaft EW1 and the drive output shaft AbW serves to bypass the range group 2 when shifting from the low gear of the range group 2 to its high gear. The force flow of the bypass gear (direct gear, $5^{th}$ gear) passes directly from K1 via the shifting element S5 to the drive output shaft. The carrier ST of the range group 2 does not lie in this force flow path.

Since owing to the design of the shifting elements S7 and S8 as locking synchronizers a change from the highest gear of the main group 1 when in the lower transmission ratio of the range group to the lowest gear of the main group 1 when in the higher range group transmission ratio, can only be carried out with interruption of the traction force, since the ring gear HO would first have to be decoupled from the drive output shaft AbW and then fixed to the housing 7. If now the input shaft EW1 is directly connected to the drive output shaft AbW by means of the shifting element S5, then direct transmission of rotational movement to the drive output shaft AbW takes place, whereby the planetary stage 6 of the range group 2 is shifted while free from load.

By virtue of the design of the drive output shaft AbW it can be connected to the input shaft without problems during this and, nevertheless, the gear step F that defines a reversing gear of the main group 1 can be positioned axially adjacent to the range group 2, whereby the assembly effort for fitting the intermediate wheel Z11 is reduced. This is because in the transition area from the main group 1 to the range group 2 there is usually a parting plane of the housing 7, so that the intermediate wheel Z11 with its intermediate wheel bolt can be positioned without problems.

FIG. 2 now shows an example shifting scheme for the motor vehicle transmission in FIG. 1. In total, eight powershiftable forward gears and two reversing gears can be obtained. The index UD denotes an underdrive situation, i.e. when the internal combustion engine is running at a higher speed than the drive output shaft AbW, whereas during an overdrive situation OD the internal combustion engine runs at a slower speed than the drive output shaft. As can be seen from FIG. 2, the first forward gear is obtained when the powershift element K1 is closed so that the input shaft EW1 is connected to the drive input side AN, and the shifting elements S6 and S7 are actuated. To change to the second forward gear the shifting element S2 has to be actuated in advance and then a shift between the powershift elements K1 and K2 is carried out and the shifting element S6 is opened. A third forward gear is obtained by actuating the shifting element S3 and then closing the powershift element K1, whereas a fourth forward gear is obtained by actuating the shifting element S1 and the powershift element K2.

The fourth forward gear at the same time is the highest gear of the main group 1 when the range group 2 is set to its lower range, so that when shifting to the fifth forward gear in principle a shift in the range group 2 with load interruption would take place. This load interruption is now avoided in that only the shifting element S5, which connects the drive output shaft AbW to the input shaft EW1, is actuated.

Owing to the actuation of the powershift element K1, the input shaft EW1 is then also coupled in a rotationally fixed manner to the drive input side AN.

Following the fifth forward gear a sixth forward gear is obtained by actuating the shifting elements S2 and S8 as well as the powershift element K2. The next, seventh forward gear is obtained by actuating the shifting element S3 and closing the powershift element K1. Finally, the eighth forward gear is engaged by closing the shifting element S1 and changing the powershift element K2 to an actuated condition.

For the two reversing gears in each case the powershift element K1 is closed, and in the first reversing gear the shifting elements S4 and S7 are closed, while for the second reversing gear the shifting elements S4 and S8 are closed.

By virtue of the design of a motor vehicle transmission according to the invention, it is possible to realize a powershiftable bypassing of a range group 2 by directly connecting a drive output shaft AbW to an input shaft of the main group 1 upstream therefrom.

Figure 3:
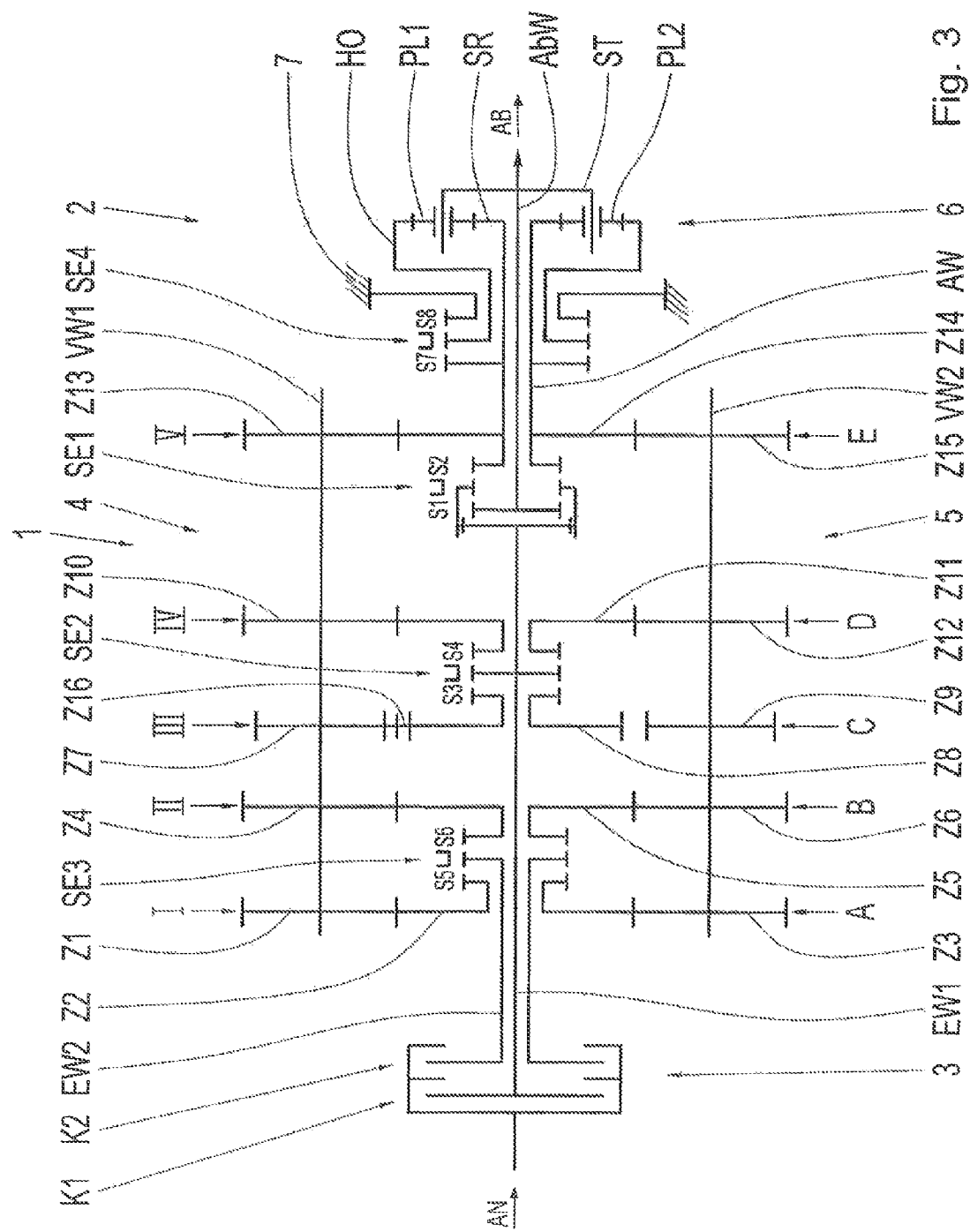
FIG. 3: A schematic representation of a motor vehicle transmission according to a second preferred embodiment of the invention.

FIG. 3 shows a schematic view of a second preferred embodiment of a motor vehicle transmission according to the invention, this motor vehicle transmission preferably also being that of a commercial vehicle. Thus, the motor vehicle transmission comprises a main group 1 and a range group 2 connected downstream from the main group 1, the main group 1 and range group 2 being provided between a drive input side AN and a drive output side AB of the motor vehicle transmission.

The transmission in FIG. 3 is a dual-clutch transmission with two clutches K1 and K2, each of which connects an internal combustion engine (not shown) on the drive input side AN respectively to the input shafts EW1 and EW2 of two partial transmissions of the main transmission 1. The main transmission comprises two countershaft gear arrangements 4 and 5 with countershafts VW1 and VW2. The power is divided between the countershafts VW1 and VW2. Shifting devices SE1, SE2 and SE3 are fitted only on the main axis. The loose wheels Z2 and Z5 are arranged on the input shaft EW2 and the loose wheels Z8 and Z11 are arranged on the input shaft EW1, to which shafts they can be connected respectively by means of the shifting elements S5, S6, S3 and S4, these shifting elements S5, S6, S3 and S4 again being combined in shifting devices SE3 and SE2 respectively. In contrast, the fixed wheel Z14 is arranged on the output shaft AW of the main transmission 1.

The fixed wheels Z1, Z3, Z4, Z6, Z7, Z9, Z10, Z12, Z13 and Z15 arranged on the countershafts mesh with the wheels Z2, Z5, Z8, Z11 and Z14. Thus, in the main transmission there are 5 gearset planes I, II, III, IV and V, in which 5 gear steps A to E are formed. In this case the gearset plane V forms a drive output constant. In the third gearset plane III there is an additional gearwheel Z16, which reverses the rotation direction for a reversing gear.

In the force flow direction after the main transmission is arranged a range group 2 consisting of a planetary gearset with a sun gear SR, a planetary carrier ST on which planetary gearwheels PL1, PL2 etc, are mounted, and a ring gear HO. The carrier ST is connected in a rotationally fixed manner to the drive output shaft AbW and the sun gear to the output shaft AW of the main transmission. When the shifting element S8 is actuated the ring gear HO can be fixed onto the transmission housing. When the shifting element S7 is actuated the ring gear HO is connected to the sun gear SR in such manner that the range group 2 is in a block-rotation condition.

The drive output shaft AbW can be connected directly to the input shaft EW1 by actuating the shifting element S1. This forms a direct gear by which the range group 2 is bypassed, so that it can be shifted while free from load, By actuating the shifting element S2 the input shaft EW1 can also be connected directly to the output shaft AW of the main transmission 1.

FIG. 4 shows the shifting matrix for the transmission according to FIG. 3. The transmission has 8 forward gears and 2 reversing gears. Of the forward gears the $5^{th}$ gear, which is the bypassing gear, is a direct gear while gears 1 to 4 are underdrive gears, i.e. in which the internal combustion engine (AN) rotates at a higher speed than the drive output shaft AbW. In contrast, gears 7 and 8 are overdrive gears, i.e. the internal combustion engine (AN) rotates more slowly than the drive output shaft AbW.

Figure 5:
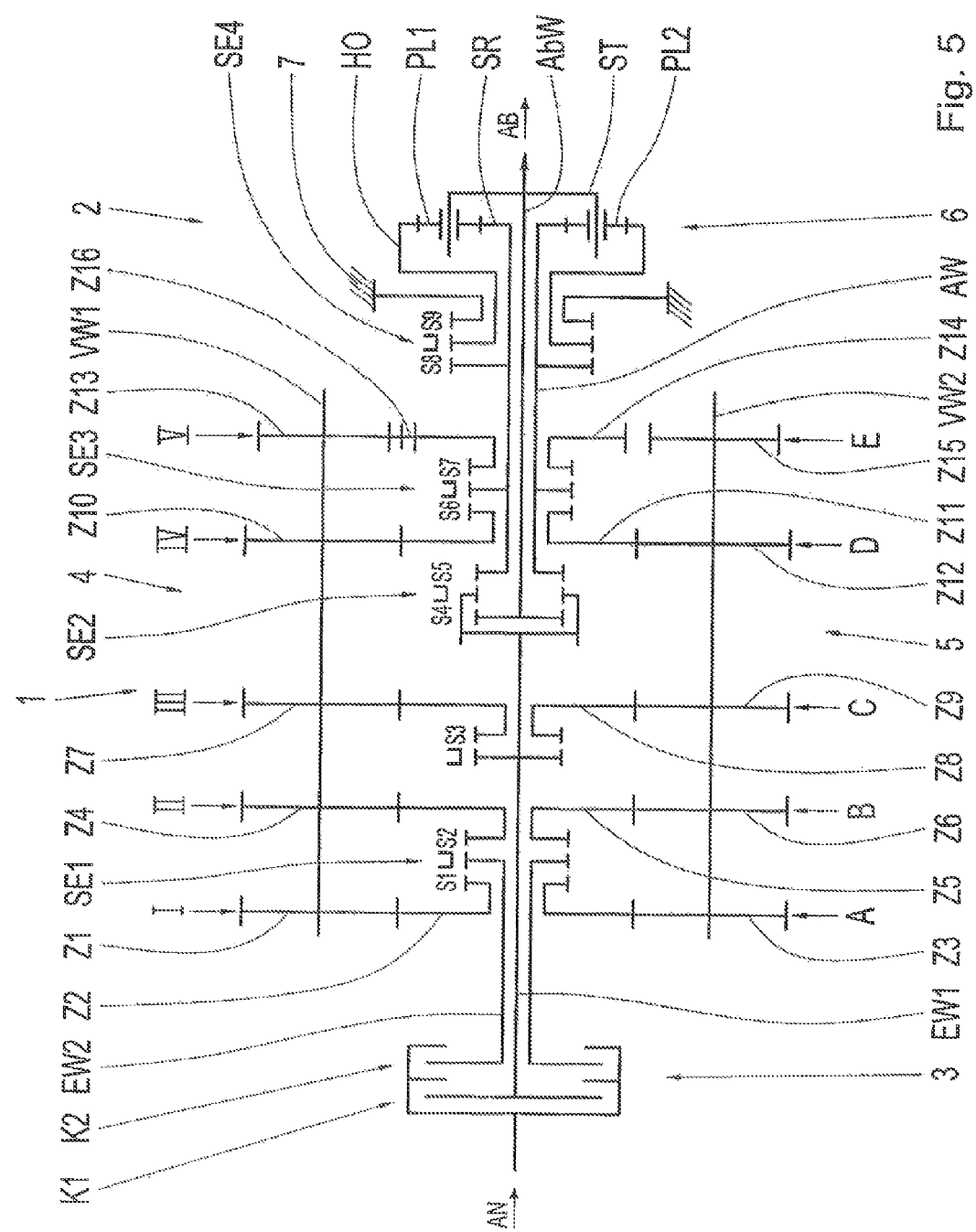
FIG. 5: A schematic representation of a motor vehicle transmission according to a third preferred embodiment of the invention.

FIG. 5 shows a schematic view of a further motor vehicle transmission according to a third embodiment of the invention, this motor vehicle transmission also preferably being that of a commercial vehicle. In this case too the motor vehicle transmission comprises a main group 1 and a range group 2 connected downstream from the main group 1, with the main group 1 and the range group 2 provided between a drive input side AN and a drive output side AB of the motor vehicle transmission.

The transmission of FIG. 5 is again a dual-clutch transmission with two clutches K1 and K2, which connect an internal combustion engine (not shown) on the drive input side AN, respectively, to the input shafts EW1 and EW2 of two partial transmissions of the main transmission 1. The main transmission has two countershaft gear arrangements 4 and 5 with countershafts VW1 and VW2. In this case too a power division takes place between the countershafts VW1 and VW2. The shifting devices SE1, SE2 and SE3 and the single shifting element S3 are located only on the main axis. The loose wheels Z2 and Z5 are arranged on the input shaft EW2 and the loose wheel Z8 on the input shaft EW1, to which they can be connected, respectively, by means of the shifting elements S1, S2 and S3, of which the shifting elements S1 and S2 are combined in the shifting device SE1. The loose wheels Z11 and Z14, in contrast, are arranged on the output shaft AW of the main transmission 1 and can be connected thereto by the shifting elements S6 and S7, respectively, these again being combined in a shifting device SE3. By means of the shifting elements S4 and S5, which are combined in a shifting device SE2, the input shaft EW1 can be connected respectively to the drive output shaft AbW and to the output shaft AW of the main transmission.

The fixed wheels Z1, Z3, Z4, Z6, Z7, Z9, Z10, Z12, Z13 and Z15 arranged on the countershafts VW1 and VW2 mesh with the wheels Z2, Z5, Z8, Z11 and Z14. Thus, in the main transmission there are 5 gearset planes I, II, III, IV and V, in which 5 gear steps A to E are formed. In the $5^{th}$ gearset plane V there is an additional gearwheel Z16, which produces a rotation direction reversal for a reversing gear.

The $1^{st}$ gear is a so-termed coupling gear, in which the two partial transmissions are coupled. The $2^{nd}$ gear is necessarily preselected thereby. The $6^{th}$ gear is the same coupling gear, but in the fast range. Accordingly, the $7^{th}$ gear is necessarily preselected. The 5-to-6 shift is carried out as a so-termed support gear shift. During this the $7^{th}$ gear is preselected and the traction force is supported by means of that gear with the clutch K1 slipping, whereas with K2 the 5-to-6 shift is carried out without any friction work.

In the force flow direction after the main transmission is arranged a range group 2 consisting of a planetary gearset with a sun gear SR, a planetary carrier ST on which planetary gearwheels PL1, PL2 etc. are mounted, and a ring gear HO. The carrier ST is connected in a rotationally fixed manner to the drive output shaft AbW and the sun gear to the output shaft AW of the main transmission. When the shifting element S9 is actuated the ring gear HO can be fixed onto the transmission housing. When the shifting element S8 is actuated the ring gear HO is connected to the sun gear SR in such manner that the range group 2 is in a block-rotation condition.

The drive output shaft AbW can be connected directly to the input shaft EW1 by actuating the shifting element S4. This forms a direct gear which bypasses the range group 2, so that it can be shifted while free from load.

By actuating the shifting element S5, the input shaft EW1 can also be connected directly to the output shaft AW of the main transmission 1.

FIG. 6 shows the shifting matrix for the transmission of FIG. 5. The transmission has 10 forward gears and 3 reversing gears. Of the forward gears, the $7^{th}$ gear, which forms the bypassing gear, is a direct gear whereas the gears 1 to 6 are underdrive gears, i.e. in which the internal combustion engine (AN) rotates faster than the drive output shaft AbW. Gears 8 to 10, in contrast, are overdrive gears, i.e. the internal combustion engine (AN) rotates more slowly than the drive output shaft AbW.

INDEXES

| | |
|---|---|
| 1 | Main group |
| 2 | Range group |
| 3 | Dual clutch |
| 4 | First countershaft gear arrangement |
| 5 | Second countershaft gear arrangement |
| 6 | Planetary stage |
| 7 | Housing |
| I | First wheel plane |
| II | Second wheel plane |
| III | Third wheel plane |
| IV | Fourth wheel plane |
| V | Fifth wheel plane |
| AN | Drive input side |
| AB | Drive output side |
| EW1 | Input shaft |
| EW2 | Input shaft |
| VW1 | Countershaft |
| VW2 | Countershaft |
| AW | Output shaft of the main transmission |
| AbW | Drive output shaft |
| Z1 | Gearwheel |
| Z2 | Gearwheel |
| Z3 | Gearwheel |
| Z4 | Gearwheel |
| Z5 | Gearwheel |
| Z6 | Gearwheel |
| Z7 | Gearwheel |
| Z8 | Gearwheel |
| Z9 | Gearwheel |
| Z10 | Gearwheel |
| Z11 | Gearwheel |
| Z12 | Gearwheel |
| Z13 | Gearwheel |
| Z14 | Gearwheel |
| Z15 | Gearwheel |
| Z16 | Gearwheel |
| S1 | Shifting element |
| S2 | Shifting element |
| S3 | Shifting element |
| S4 | Shifting element |
| S5 | Shifting element |
| S6 | Shifting element |
| S7 | Shifting element |
| S8 | Shifting element |
| S9 | Shifting element |

-continued

| | |
|---|---|
| SE1 | Shifting device |
| SE2 | Shifting device |
| SE3 | Shifting device |
| SE4 | Shifting device |
| A to F | Gear steps |
| HO | Ring gear |
| ST | Planetary carrier |
| SR | Sun gear |
| PL1 | Planetary gearwheel |
| PL2 | Planetary gearwheel |
| K1 | Powershift element |
| K2 | Powershift element |

The invention claimed is:

1. A motor vehicle transmission, of a group configuration, comprising:
an at least partially powershiftable main group (1), and
a range group (2) connected downstream from the main group (1),
the range group comprising a planetary stage (6) having transmission components comprising a ring gear (HO), a sun gear (SR), and a planetary carrier (ST) that guides at least one planetary gearwheel (PL1, PL2),
wherein of these transmission components, a first transmission component is connected to a drive output shaft (AbW) of the range group (2) and a second transmission component is connected to an output shaft (AW) of the main group (1), and a third transmission component, on the one hand, is fixable to a housing (7) and, on the other hand, is couplable to either the first or the second transmission component,
the drive output shaft (AbW) of the range group (2) is directly connectable in a rotationally fixed manner, to an input shaft of the main group (1) by a shifting element in such manner that a direct gear is formed when the drive output shaft (AbW) of the range group (2) is connected to the input shaft of the main group (1), and
the drive output shaft (AbW) passes axially through the planetary stage (6) to the input shaft of the main group (1), and the drive output shaft (AbW) is a central shaft over which the output shaft (AW) of the main group (1) is positioned as a coaxially extending hollow shaft.

2. The motor vehicle transmission according to claim 1, wherein the drive output shaft (AbW) of the range group (2) is directly connectable, in a rotationally fixed manner, to the input shaft of the main group (1) by a single shifting element.

3. The motor vehicle transmission according to claim 1, wherein the drive output shaft (AbW) of the range group (2) is directly connectable, in a rotationally fixed manner, to the output shaft (AW) of the main group (1).

4. The motor vehicle transmission according to claim 1, wherein two countershaft gear arrangements (4, 5) are provided axially offset relative to the output shaft (AW) of the main group and to the at least one input shaft (EW1, EW2) of the main group, and gear steps (A to F) of the main group (1) located, on the one hand, between the at least one input shaft (EW1, EW2) of the main group and the countershaft gear arrangements (4, 5) and, on the other hand, between the output shaft (AW) of the main group and the countershaft gear arrangements (4, 5), in each case, comprise a gearwheel on a side of either the at least one input shaft (EW1, EW2) or the output shaft (AW) which, in each case, is in connection on both sides with gearwheels present in the countershaft gear arrangements (4, 5).

5. The motor vehicle transmission according to claim 1, wherein the main group (1) comprises of two partial transmissions which have input shafts (EW1, EW2) that extend coaxially with one another, and each of which is connectable into a force flow to the drive output shaft (AbW) of the range group in alternation by connecting its associated input shaft (EW1, EW2) to a drive input side (AN).

6. The motor vehicle transmission according to claim 1, wherein a gear step (F) of the main group (1), axially directly adjacent to the range group (2), is designed as a gearset of a reversing gear.

7. The motor vehicle transmission according to claim 1, wherein the planetary carrier (ST) is the first transmission component of the range group (2), the sun gear (SR) is the second transmission component of the range group (2), and the ring gear (HO) is the third transmission component of the range group (2).

8. The motor vehicle transmission according to claim 1, wherein a spur gear of a main gear produces at least one gear which forms an overdrive gear.

9. The motor vehicle transmission according to claim 1, wherein the direct gear is connectable to either the drive output shaft or to the sun gear of the range group by a double shifting element.

10. A motor vehicle transmission of group configuration, the transmission comprising:
an at least partially powershiftable main group and a range group being connected downstream from the main group;
the range group comprising a planetary stage having a ring gear, a sun gear, and a planetary carrier supporting at least one planetary gearwheel;
a first one of the ring gear, the sun gear, and the planetary carrier being connected to a drive output shaft of the range group;
a second one of the ring gear, the sun gear, and the planetary carrier being connected to an output shaft of the main group;
a third one of the ring gear, the sun gear, and the planetary carrier being connectable to a housing in a rotationally fixed manner and being connectable to either the first or the second one of the ring gear, the sun gear, and the planetary carrier;
the drive output shaft of the range group being directly connectable, via a shifting element, to an input shaft of the main group for forming a direct gear; and
the drive output shaft of the range group being a central shaft passing axially through the planetary stage to the input shaft of the main group, and passing axially through the coaxially aligned output shaft of the main group which is a hollow shaft.

* * * * *